United States Patent
Park et al.

(10) Patent No.: US 12,462,892 B2
(45) Date of Patent: Nov. 4, 2025

(54) DYNAMIC FAULT CLUSTERING METHOD AND APPARATUS

(71) Applicants: SK hynix Inc., Icheon (KR); Korea University Research and Business Foundation, Seoul (KR)

(72) Inventors: Jong Sun Park, Seoul (KR); Kwan Ho Bae, Seoul (KR); Jin Ho Jeong, Yongin (KR); Seung Hwan Bang, Seoul (KR)

(73) Assignees: SK hynix Inc., Icheon (KR); Korea University Research and Business Foundation, Seoul (KR)

( * ) Notice: Subject to any disclaimer, the term of this patent is extended or adjusted under 35 U.S.C. 154(b) by 205 days.

(21) Appl. No.: 17/898,992

(22) Filed: Aug. 30, 2022

(65) Prior Publication Data

US 2023/0317198 A1    Oct. 5, 2023

(30) Foreign Application Priority Data

Apr. 1, 2022    (KR) .................. 10-2022-0041215

(51) Int. Cl.
  *G11C 29/18*    (2006.01)
  *G11C 29/00*    (2006.01)
  *G11C 29/44*    (2006.01)
  *G11C 29/46*    (2006.01)

(52) U.S. Cl.
  CPC .............. *G11C 29/46* (2013.01); *G11C 29/18* (2013.01); *G11C 29/44* (2013.01); *G11C 29/4401* (2013.01); *G11C 29/785* (2013.01); *G11C 29/808* (2013.01)

(58) Field of Classification Search
  CPC ... G11C 29/46; G11C 29/4401; G11C 29/785; G11C 29/18; G11C 29/44; G11C 29/808
  See application file for complete search history.

(56) References Cited

U.S. PATENT DOCUMENTS

| | | | |
|---|---|---|---|
| 8,432,758 B2* | 4/2013 | Jeong ...................... | G11C 29/44 365/230.06 |
| 8,601,330 B2* | 12/2013 | Jeong ................... | G11C 29/808 714/704 |
| 2020/0395093 A1* | 12/2020 | Kang ................. | G11C 29/4401 |
| 2021/0295944 A1* | 9/2021 | Lim .................... | G11C 29/4401 |
| 2022/0130486 A1* | 4/2022 | Kang ............... | G11C 29/56016 |

FOREIGN PATENT DOCUMENTS

KR    20210077594 A * 6/2021 .......... G06F 11/2257

OTHER PUBLICATIONS

T. Li, et al., "Fault clustering technique for 3D memory BISR," Design, Automation & Test in Europe Conference & Exhibition (DATE ), 2017, pp. 560-656 (Year: 2017).*

(Continued)

*Primary Examiner* — Amir Zarabian
*Assistant Examiner* — Justin Bryce Heisterkamp

(57) ABSTRACT

A dynamic fault clustering method and apparatus for efficiently managing redundancy in semiconductor memories performs a collection operation of searching for and detecting a fault and an operation of appropriately clustering the fault at the same time, which reduces an amount of time spent performing Built-In Redundancy Analysis (BIRA).

8 Claims, 16 Drawing Sheets

(56) References Cited

OTHER PUBLICATIONS

T. Ni et al., "A Novel Built-In Self-Repair Scheme for 3D Memory," in IEEE Access, vol. 7, pp. 65052-65059, 2019 (Year: 2019).*
Li et al., "Fault clustering technique for 3D memory BISR," Design, Automation & Test in Europe Conference & Exhibition, 2017, pp. 560-656 (Year: 2017).*
Ni et al., "A Novel Built-In Self-Repair Scheme for 3D Memory," in IEEE Access, vol. 7, pp. 65052-65059, 2019 (Year: 2019).*
Yang et al., "Efficient BISR Techniques for Embedded Memories Considering Cluster Faults," 13th Pacific Rim International Symposium on Dependable Computing (PRDC 2007), Melbourne, VIC, Australia, 2007, pp. 224-231 (Year: 2017).*
T. Li et al., "Fault clustering technique for 3D memory BISR", Design Automate and Test in Europe (DATE), IEEE, 2017.
X. Wang et al., "Global Built-In Self-Repair for 3D Memories with Redundancy Sharing and Parallel Testing", 2011 EEE International 3D Systems Integration Conference (3DIC), 2011.

* cited by examiner

Fig. 3

| LA | RA | CA | ML | RMF | CMF |
|----|----|----|----|-----|-----|
| 1  | 2  | 3  | 1  | 0   | 1   |
| 1  | 5  | 0  | 1  | 0   | 1   |
| 2  | 0  | 3  | 1  | 0   | 1   |
| 2  | 3  | 0  | 1  | 0   | 1   |
| 2  | 4  | 1  | 4  | 0   | 1   |
| 3  | 3  | 1  | 4  | 0   | 1   |
| 3  | 4  | 0  | 1  | 0   | 1   |
| 4  | 1  | 3  | 4  | 0   | 1   |
| 4  | 5  | 1  | 4  | 0   | 1   |

Fig. 4

LAYER 1

|    | C0 | C1 | C2 | C3 |
|----|----|----|----|----|
| R0 |    | #1 |    | #2 |
| R1 |    |    |    |    |
| R2 |    |    |    |    |
| R3 |    |    |    |    |

REDUNDANCY STORAGE DEVICE(RCAM)

| LA | RA | CA | ML | RMF | CMF |
|----|----|----|----|-----|-----|
| 1  | 0  | 1  | 1  | 1   | 0   |
| 1  | 0  | 3  | 1  | 1   | 0   |

LAYER 2

|    | C0 | C1 | C2 | C3 |
|----|----|----|----|----|
| R0 |    |    |    |    |
| R1 |    |    |    |    |
| R2 |    |    |    |    |
| R3 |    |    |    |    |

ADDRESS STORAGE DEVICE(ACAM)

| LA | RA | CA | ML | R/CEF |
|----|----|----|----|-------|
|    |    |    |    |       |

Fig. 5

|    | C0 | C1 | C2 | C3 |
|----|----|----|----|----|
| R0 |    | #1 |    | #2 |
| R1 |    |    |    |    |
| R2 |    |    |    |    |
| R3 |    |    |    |    |

LAYER 1

REDUNDANCY STORAGE DEVICE(RCAM)

| LA | RA | CA | ML | RMF | CMF |
|----|----|----|----|-----|-----|
| 1  | 0  | 1  | 1  | 1   | 0   |
| 1  | 0  | 3  | 1  | 1   | 0   |
| 2  | 3  | 2  | 2  | 0   | 0   |

|    | C0 | C1 | C2 | C3 |
|----|----|----|----|----|
| R0 |    |    |    |    |
| R1 |    |    |    |    |
| R2 |    |    |    |    |
| R3 |    |    | #3 |    |

LAYER 2

ADDRESS STORAGE DEVICE(ACAM)

| LA | RA | CA | ML | R/CEF |
|----|----|----|----|-------|
|    |    |    |    |       |

Fig. 7

LAYER 1

|    | C0 | C1 | C2 | C3 |
|----|----|----|----|----|
| R0 |    | #1 |    | #2 |
| R1 |    |    |    |    |
| R2 |    |    | #4 | #5 |
| R3 |    |    |    |    |

LAYER 2

|    | C0 | C1 | C2 | C3 |
|----|----|----|----|----|
| R0 |    |    |    |    |
| R1 |    |    |    |    |
| R2 |    |    | #4 | #5 |
| R3 |    |    | #3 |    |

REDUNDANCY STORAGE DEVICE(RCAM)

| LA | RA | CA | ML | RMF | CMF |
|----|----|----|----|-----|-----|
| 1  | 0  | 1  | 1  | 1   | 0   |
| 1  | 0  | 3  | 1  | 1   | 0   |
| 2  | 3  | 2  | 2  | 0   | 1   |
| 2  | 2  | 3  | 1  | 0   | 0   |

ADDRESS STORAGE DEVICE(ACAM)

| LA | RA | CA | ML | R/CEF |
|----|----|----|----|-------|
| 1  | 2  | 2  | 2  | 0     |

DYNAMIC FAULT CLUSTERING METHOD AND APPARATUS

CROSS-REFERENCE TO RELATED APPLICATION

This application claims priority under 35 U.S.C. § 119 to Korean Patent Application No. 10-2022-0041215 filed on Apr. 1, 2022, which is incorporated herein by reference in its entirety.

BACKGROUND

1. Field

Illustrative embodiments relate to a dynamic fault clustering method and apparatus for searching for and detecting a fault when the fault has occurred in a semiconductor memory cell for storing binary information, and are for more effectively performing clustering before all faults are detected.

2. Discussion of the Related Art

As a process technology for making semiconductor integrated circuits is continuously developed, the degree of integration of semiconductor memory products has also been significantly improved. The number of errors (faults) occurring in a memory cell for storing binary information has significantly increased in proportion to the high integration, resulting in an increase in test cost. A technology of replacing a fault cell with an appropriate spare cell in order to cure a fault has been used for a long time, but it also becomes more and more complicated as the degree of integration increases.

In a technology of detecting a fault cell and appropriately repairing the fault cell in order to improve the yield of memory products, particularly, an area of redundancy for efficiently using a semiconductor area, consumption of time for repair, efficiency of repair, and the like are used as indicators affecting the productivity of semiconductor memories.

When a read or write operation on a memory cell fails to complete, the cell may be defined as an erroneous cell. Depending on the type of error, an error in which one bit of cell is defective may be called a single fault.

Extra cells prepared to replace erroneous cells are called spare cells or redundancies, and they are dedicated to each array, each block, each sector, or each layer of a memory cell. The terms array, block, sector, layer, and the like may refer to a division of the total number of cells existing in a memory chip by an appropriate capacity, or may also mean a set of memory cells belonging to each chip in an element, such as a high bandwidth memory (HBM), in which several memory chips are stacked and connected by, for example, through-silicon vias (TSVs).

The redundancies are divided into row redundancy and column redundancy, redundancy prepared for each layer is called local redundancy, and redundancy prepared so that a fault can be repaired without distinguishing between rows and columns is called global redundancy.

A method of providing such redundancy in a semiconductor memory, analyzing an error, and then using the redundancy to repair the error is called built-in redundancy analysis (BIRA), and a circuit operation performed in a memory chip in order to detect an error is called a built-in self-test (BIST).

Among the methods of BIRA, it may be necessary to move repair of an error occurring in one layer to another layer in order to more efficiently use redundancy. This is called clustering.

Among the techniques used for BIRA that employ clustering, selecting an appropriate repair method after detecting all the faults in a memory layer is called static fault clustering, and selecting the appropriate repair method for a fault at the same time as detecting the fault is called dynamic fault clustering.

A memory layer in which a fault has occurred is called a mapping layer, and a layer to which responsibility for repairing the fault is to be moved for clustering is called a mapped layer. In the related art, when a fault occurs, the fault is analyzed, a mapping layer and a mapped layer are determined, and then a direction of mapping or a direction of clustering is also determined.

SUMMARY

Various embodiments are directed to allowing a semiconductor memory for storing binary information to improve a repair rate, shorten repair time, and the like by performing appropriate clustering even before all faults are detected, in a fault clustering technology.

A dynamic fault clustering method of a semiconductor memory in accordance with an embodiment of the present disclosure includes: a step of starting a self-test in a memory cell array divided into layers; a step of checking whether a row address or a column address of a new fault matches a row address or a column address of a previously detected fault from an address storage device when the new fault is searched for; a step of correcting a layer number to which the new fault belongs when the row address or the column address of the new fault matches the row address or the column address of the previously detected fault as a result of the check; a step of determining whether to perform must repair when the row address or the column address of the new fault does not match the row address or the column address of the previously detected fault as a result of the check; a step of storing information on the must repair in a redundancy storage device when it is determined to perform the must repair; a step of checking whether the fault is clustered from a layer, to which the fault belongs, to another layer when it is determined not to perform the must repair; a step of storing corresponding layer information in the address storage device when it is determined that the fault is clustered; and a step of storing corresponding layer information in the redundancy storage device when it is determined that the fault is not clustered.

A dynamic fault clustering apparatus of a semiconductor memory in accordance with an embodiment of the present disclosure includes: a semiconductor memory cell array including a plurality of layers and configured to store binary information; a global redundancy including extra cells provided to replace a fault occurring in the layer; a redundancy storage device configured to store a layer number, a row address, and a column address for the fault; an address storage device configured to store whether to perform row repair or column repair for the fault; a multiplexer configured to select binary information from one of the layer and the global redundancy; and a redundancy analyzer configured to perform analysis for clustering from a layer, to which the fault belongs, to another layer.

In accordance with the present disclosure, a collection operation for searching for and detecting a fault and a clustering operation can be performed at the same time so that redundancy of a semiconductor memory can be performed more effectively, which makes it possible to minimize the time required for repair and providing a more efficient search and determination method.

BRIEF DESCRIPTION OF THE DRAWINGS

FIG. 3 illustrates, as an example, the content of a redundancy storage device associated with a clustering process according to an embodiment of the present disclosure.

FIG. 4 to FIG. 7 illustrate a process according to an embodiment of the present disclosure on a step-by-step basis.

DETAILED DESCRIPTION

Figure 1:
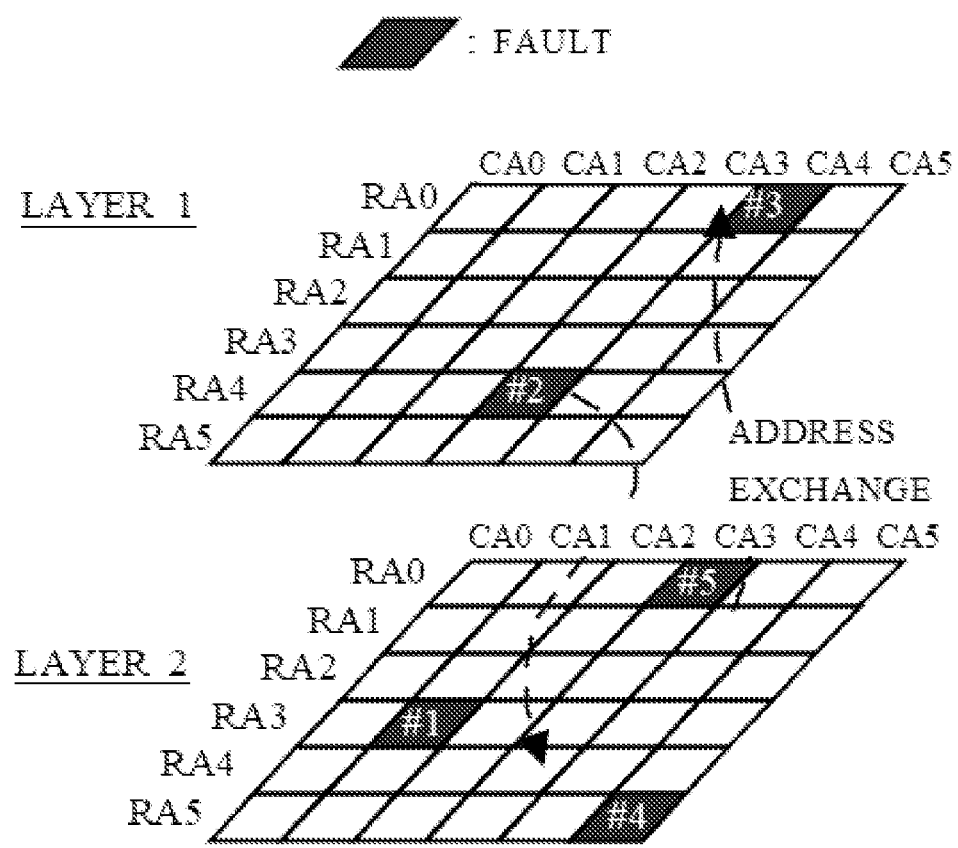
FIG. 1 is a diagram for schematically explaining the present disclosure.

Hereinafter, embodiments of the present disclosure will be described in detail with reference to the accompanying drawings so that the present disclosure can be easily carried out by those skilled in the art to which the present disclosure pertains. The same reference numerals among the reference numerals in each drawing indicate the same elements.

In the description of the present disclosure, when it is determined that detailed descriptions of related publicly-known technologies may obscure the subject matter of the present disclosure, the detailed descriptions thereof will be omitted.

The terms such as first and second may be used to describe various components, but the components are not limited by the terms, and the terms are used only to distinguish one component from another component.

Hereinafter, in the specification of the present disclosure, faults may be indicated by symbol X in a memory cell, may be indicated by a number such as #1 or #2 in order to emphasize a search order, or may be sometimes indicated as '1' in order to indicate the occurrence of a fault or the presence of a fault, and it is noted that this does not indicate binary information '1'.

Furthermore, in the specification of the present disclosure, clustering means an operation of moving responsibility for repairing faults to redundancies associated with an appropriate layer, which layer that may not be the same layer that the fault occurred in, and collecting the faults for effective repair, and is sometimes used interchangeably with a mapping operation. In the clustering, a layer to which repair of a fault is to be moved is called a mapped layer, and an original layer where the fault has occurred is called a mapping layer. The process of moving responsibility for handling a fault from the mapping layer to the mapped layer may be referred to herein as simply "moving the fault to the mapped layer," though of course the actual fault memory cell does not move.

Furthermore, repair means a repair operation of replacing operations intended to use a fault memory cell with analogous operations that instead use an extra memory cell, and the extra memory cells are called redundant cells, spare cells, or redundancy.

FIG. 1 is a diagram for explaining the schematic characteristics of the present disclosure, and for convenience, illustrates only a 6×6 memory array having row addresses RA0 to RA5 and column addresses CA0 to CA5. FIG. 1 illustrates that when faults detected in two layers are moved to another layer and clustered, the direction of the move is not fixed. For example, a second fault #2 detected in layer 1 may be moved to layer 2 and clustered, and a fifth fault #5 detected in layer 2 may be moved to layer 1 and clustered. In other words, it can be said that a mapped layer and a mapping layer have not been predetermined or the direction of mapping have not been fixed. Mapping is performed by exchanging fault addresses. For reference, layers may belong to different memory chips, or even though they belong to one chip, they may belong to different arrays, pages, sectors, or groups.

Figure 2:
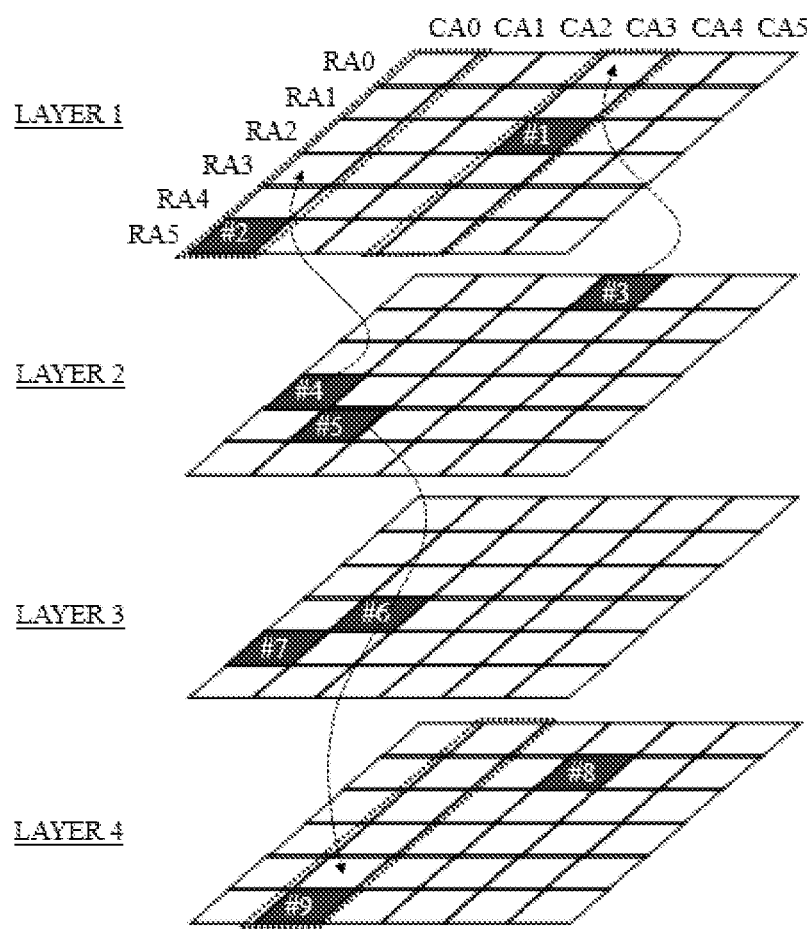
FIG. 2 is a diagram for explaining a clustering process according to an embodiment of the present disclosure.

The characteristics of the present disclosure will be described in more detail with reference to FIG. 2 and FIG. 3. FIG. 2 illustrates an example wherein a total of 9 faults are distributed in four layers, and FIG. 3 illustrates a redundancy storage device (RCAM) that stores fault addresses of the faults. As such a storage device, a content addressable memory (CAM) or a storage device similar to a CAM may be used. In FIG. 3, the symbols LA, RA, CA, ML, RMF, and CMF indicate a layer number or a layer address, a row address, a column address, a number of a mapped layer to which a fault is to be moved, a row-must flag indicating row-wise repair, and a column-must flag indicating column-wise repair, respectively. A value of ML equal to LA indicates that no mapping is performed and a fault stays in (that is, is handled by redundancy associated with) an original layer. Since RMF and CMF have meaning only as flag signals, it is assumed in the present disclosure that a value of '1' indicates that repair is required.

As indicated by arrows in FIG. 2, faults occurring in each layer may be clustered in any layer according to a characteristic operation of the present disclosure. That is, a mapped layer and a mapping layer may not be fixed and may be changed for each fault for efficient repair. For example, among three faults #3, #4, and #5 detected in layer 2, since the faults #3 and #4 having row and column addresses of (RA, CA)=(0, 3) and (RA, CA)=(3, 0) share column addresses with faults #1 and #2 of layer 1, respectively, they may be mapped to layer 1. On the other hand, since the fault #5 of the layer 2 has an address of (RA, CA)=(4,1), it shares a column address with fault #9 of layer 4 and may be treated as column redundancy only when mapped to the layer 4. Therefore, the values of ML for the three faults #3, #4, and #5 are 1, 1, and 4, respectively.

In order to facilitate the understanding of the characteristics of the present disclosure, a redundancy method of the present disclosure will be described with an example in which faults exist in each of two layers. FIG. 4 to FIG. 7 are diagrams for explaining the redundancy method of the present disclosure on a step-by-step basis. For reference, each fault is numbered according to the order of detection. First, as illustrated in FIG. 4, the first step is a case in which fault #2 is detected after fault #1 is detected in layer 1. Analysis of these faults shows that they are located on the same row. Therefore, they only need to be repaired using a row redundancy of layer 1 and mapping is not required. Accordingly, in the storage device (RCAM) for storing redundant addresses, the values of LA, RA, CA, ML, RMF, and CMF, which are information on these faults, are stored as (1, 0, 1, 1, 1, 0) and (1, 0, 3, 1, 1, 0). In FIG. 4, when the RMF values of the two faults are 1, it means that these faults need to be repaired using a row redundancy, and when the ML value is 1, it means that these faults stay in the layer 1, which is an original layer, without clustering. In such a case, since the remaining faults have not yet been detected, an address storage device (address content addressable memory (ACAM)) is also in an empty state. For reference, the R/CEF of the address storage device (ACAM) is a row/column exchange flag signal indicating whether an address exchange direction used by clustering is a row direction or a column direction.

In the next step, when third fault #3 is detected at the position of (RA,CA)=(3,2) of layer 2 as illustrated in FIG. 5, the third fault #3 is compared with the faults of the layer 1, that is, the faults #1 and #2, for analysis. The analysis result indicates that a row address of the third fault #3 does not match a row address of any previously-detected fault and a column address of the third fault #3 does not match a column address of any previously-detected fault, which indicates that no clustering is required; such analysis is performed by an analyzer that analyzes redundancy. Since the analysis result indicates that no clustering is required, the values of the flag signals RMF and CMF indicating the presence or absence of row redundancy or column redundancy are also written as (0, 0) in the third row of RCAM as illustrated in FIG. 5.

Figure 6:
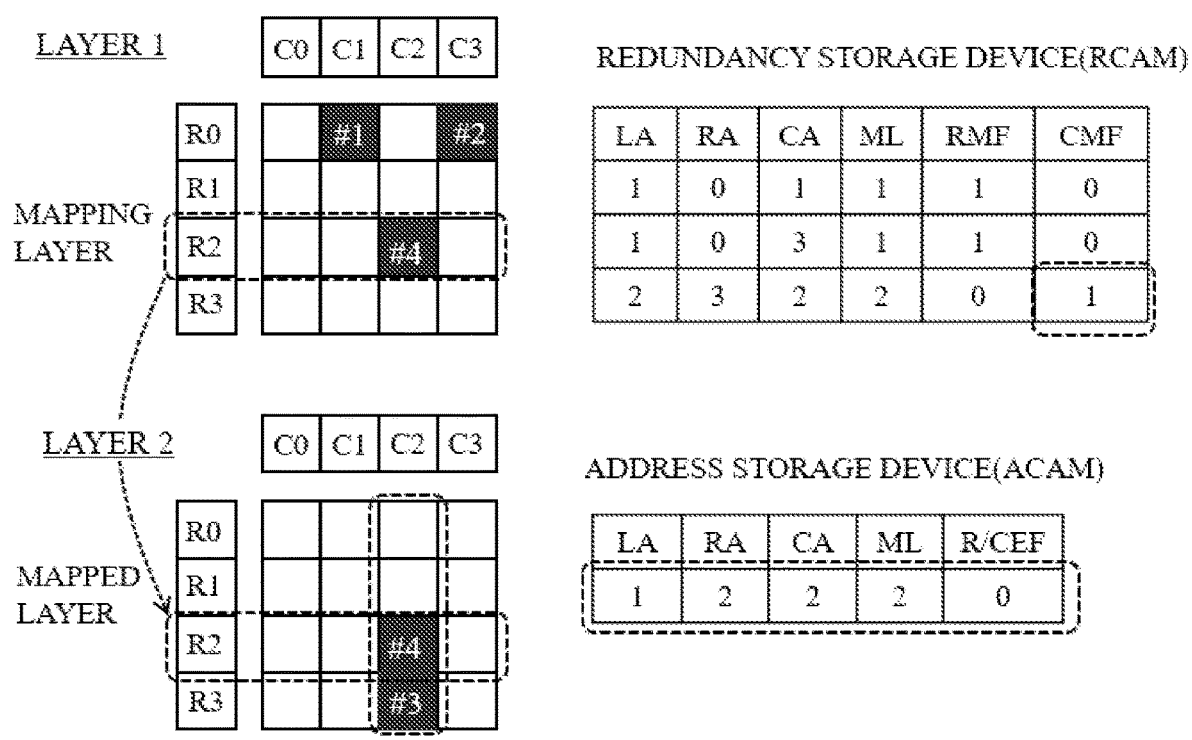

In the next step, when fourth fault #4 is detected at the position of (RA,CA)=(2, 2) of the layer 1 as illustrated in FIG. 6, the analysis result indicates that the fourth fault #4 shares a column address with the third fault #3. In such a case, it is preferable to perform clustering in which the fault #4 is mapped from the layer 1 and moved to the layer 2 and to repair the fault #4 using a column redundancy. Wherein using the column redundancy means all of the row to which the fault #4 belongs are clustered to layer 2. In such a case, the fault #4 needs to be mapped from the layer 1 and moved to the layer 2 for clustering, and the layer 2 becomes a mapped layer. Since exchange of a fault address between layers is required for mapping, this fact is written in the address storage device (ACAM) and the value of R/CEF is also written as 0, indicating that a row is being mapped. Therefore, a value representing the fault #4 in the address storage device (ACAM) is (LA, RA, CA, ML, R/CEF)=(1, 2, 2, 2, 0). Meanwhile, since the clustered faults #3 and #4 need be repaired using a column redundancy, the value of the column-must flag signal CMF of entry #3 stored in the redundancy storage device RCAM is changed to 1.

In the last step, when fifth fault #5 is detected at the position of (RA,CA)=(2,3) of the layer 2 as illustrated in FIG. 7, corresponding fault information is stored in the redundancy storage device (RCAM). In such a case, since the fault #5 exists in a row already exchanged because of the fault #4, that is, the position of RA=2 of the layer 2, the value of ML is stored as '1' in the redundancy storage device (RCAM) in consideration of this fact. When this step is described differently, the faults #4 and #5 have been mapped by exchanging the layers, and since the fault #4 has already been determined to be repaired by column redundancy, which means that the fault #5 is repaired by row redundancy after mapping. Accordingly, the redundancy operation of the present disclosure that performs dynamic clustering at the same time as each fault is detected is completed while consuming a minimum of time. That is, since the clustering is completed at the same time as the last fault is detected, determination of redundancy for repairing each fault is also completed. A series of dynamic analysis processes for performing clustering in the present disclosure are performed by a redundancy analyzer 310 to be described below.

When the clustering method of the present disclosure is compared with the static clustering method in the related art, the advantages of the present disclosure become more apparent. In the case of the static clustering in the related art, proper clustering is started only after all faults are detected. Therefore, in a first step, the faults #1 and #2 are determined to be repaired using a row redundancy only after five faults #1 to #5 are stored in the redundancy storage device (RCAM), and in a second step, the fault #3 is clustered to layer 1. Then, in a third step, the faults #3 and #4 are determined to be repaired using a column redundancy, and in a fourth step, it is determined whether to repair the fault #5 using a row redundancy or a column redundancy. Therefore, unlike the present disclosure, in the related art, since a series of processes from the first step to the fourth step are additionally required after all the faults are stored, additional time for the processes is also required.

Figure 8:
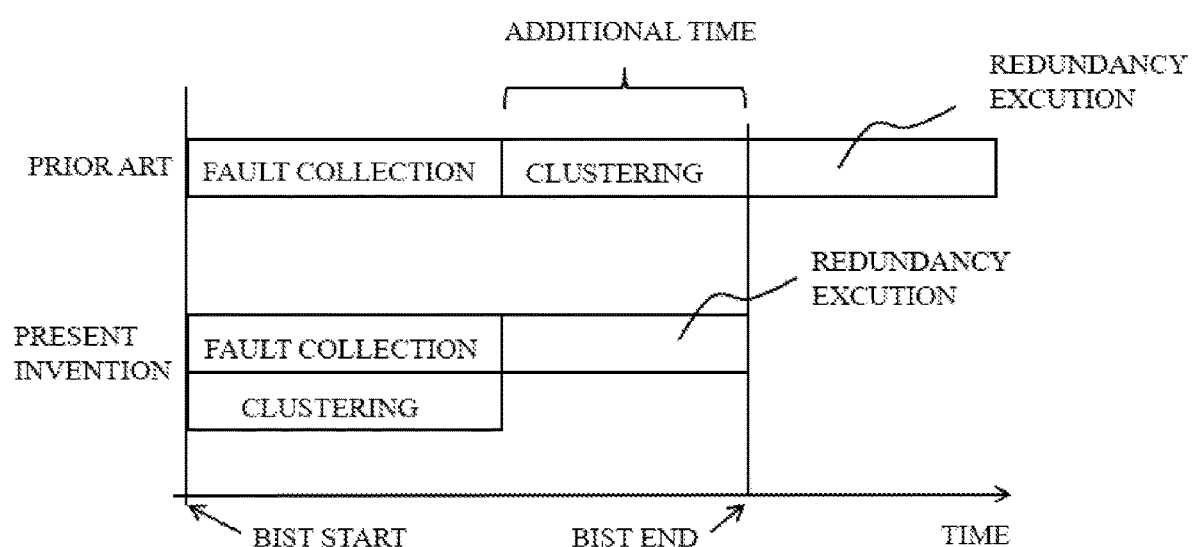
FIG. 8 illustrates an impact on analysis time of an embodiment of the present disclosure.

FIG. 8 is a graph showing intuitive comparison of analysis time between an embodiment of the present disclosure and the related art. As described above, in the embodiment of the present disclosure, since clustering is performed at the same time as a fault is detected or collected, the time required for clustering is reduced. However, in the related art, clustering is performed after all of the faults are detected. Therefore, it can be seen that the related art has a difference in the execution time of redundancy management because an additional time is required for the self-test (BIST).

Figure 9:
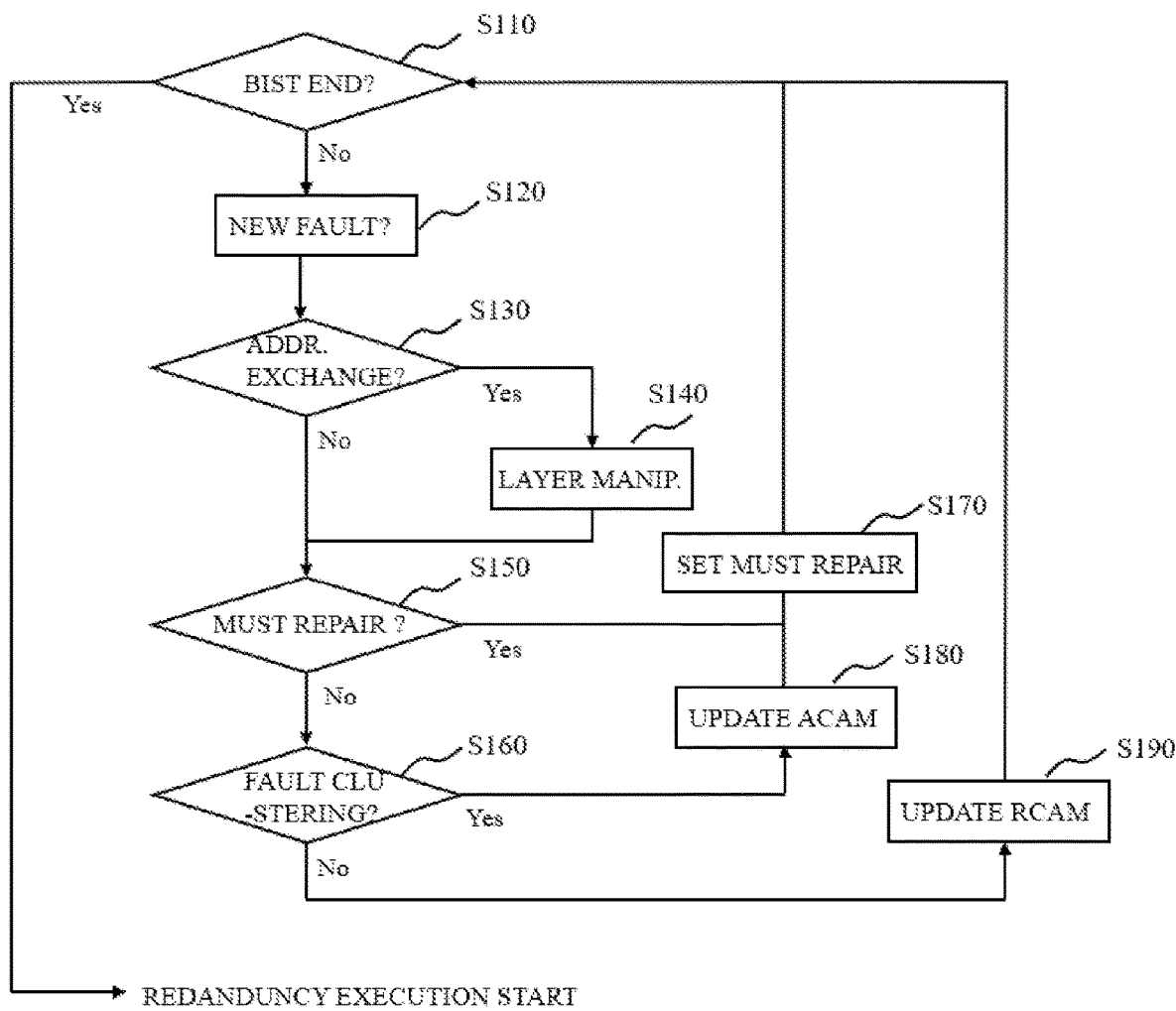
FIG. 9 is a flowchart according to an embodiment of the present disclosure.

FIG. 9 is a flowchart illustrating a clustering process in an embodiment of the present disclosure.

When the built-in self-test (BIST) for a semiconductor memory has started or has not ended yet (step S110, branch "No"), it is searched whether there is a new fault (step S120), and if the self-test is ended (step S110, branch "Yes"), fault clustering is terminated and an operation of replacing a fault cell with a redundant cell is started. Whether a row address or a column address of a newly detected fault matches that of a previously detected fault is checked in the address storage device ACAM (S130). As a result of the check, when the row address or the column address of the newly detected fault matches that of the previously detected fault, a layer number ML of the new fault is manipulated (S140), and when the row address or the column address of the newly detected fault does not match that of the previously detected fault, whether to perform a row-must or column-must repair is determined (S150). When it is determined to perform the a row-must or column-must repair, corresponding information is set in the redundancy storage device (RCAM), that is, in the entry of the RCAM corresponding to the fault, the value of RMF is set to '1' or the value of CMF is set to '1' (S170). When it is determined not to perform the row-must or column-must repair, it is checked whether the fault is to be clustered from a layer to which the fault belongs to another layer (S160). As a result of the check, when the clustering operation is possible, corresponding layer information is stored in the address storage device ACAM (S180). In step S180, the changed layer number is stored in the mapped layer number ML, and R/CEF is written as 0 in the case of row-wise clustering and R/CEF is written as 1 in the case of column-wise clustering. When the clustering operation is not possible in step S160, corresponding information is stored in the redundancy storage device (RCAM) (S190).

Figure 10:
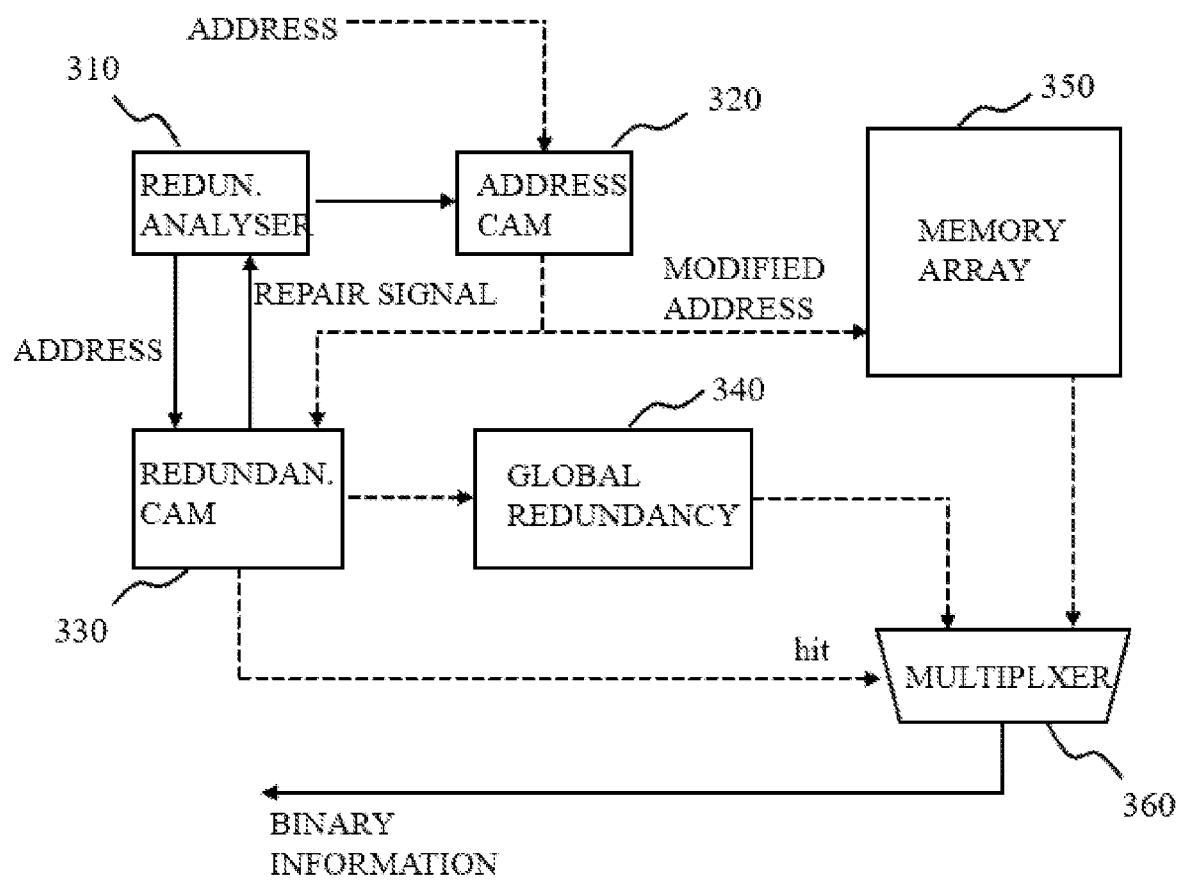
FIG. 10 illustrates an apparatus according to an embodiment of the present disclosure.

FIG. 10 illustrates a dynamic fault clustering apparatus according to an illustrative embodiment of the present disclosure. FIG. 10 shows one example of apparatuses capable of implementing the processes of the present disclosure, but embodiments are not limited thereto. The apparatus illustrated in FIG. 10 includes a memory cell array 350 that may store binary information and may be divided into multiple layers as needed, a global redundancy 340 provided to replace a fault cell, a redundancy CAM 330 provided for clustering, an address CAM 320, the redundancy analyzer 310, and a multiplexer 360.

The array 350 includes a plurality of layers, and each layer may correspond to dividing a total number of cells in a memory chip by an appropriate capacity, or each layer may correspond to a set of memory cells belonging to each chip in a device, such as a high bandwidth memory (HBM) in which several memory chips are stacked and connected by through-silicon vias (TSVs).

The global redundancy 340 may be a set of extra memory cells provided to replace a fault memory cell, and may replace a fault memory cell without distinguishing between row-wise repair or column-wise repair.

The redundancy CAM 330 may store information on a fault memory cell, that is, faults, and may store some or all of a layer number to which each fault belongs, a row address, a column address, a mapped layer number for mapping, a row-must flag indicating whether row-wise repair is required, and a column-must flag indicating whether column-wise repair is required. Preferably, as the redundancy CAM 330, a content addressable memory (CAM) or a storage device similar to the CAM may be used.

The address CAM 320 stores information on which a detected fault is layer-mapped through clustering, and is configured to store, for each fault, a layer number to which the fault belongs, a row address, a column address, a mapped layer number for mapping, and whether clustering is row-wise clustering or column-wise clustering. Preferably, as the address CAM 320, a content addressable memory (CAM) or a storage device similar to the CAM may be used.

The redundancy analyzer 310 is configured to perform a series of analysis processes according to the present disclosure, and may be implemented as a combination of logic circuits. In embodiments, the redundancy analyzer 310 may include a processor or microcontroller that contributes to the performance of one or more of the analysis processes by executing instructions stored in a non-transitory computer-readable media.

The multiplexer 360 is configured to selectively operate so that binary information may be inputted/outputted to/from the array 350 in the case of a normal memory cell and binary information may be inputted/outputted to/from the global redundancy 340 that is replacing a fault memory cell.

Figure 11:
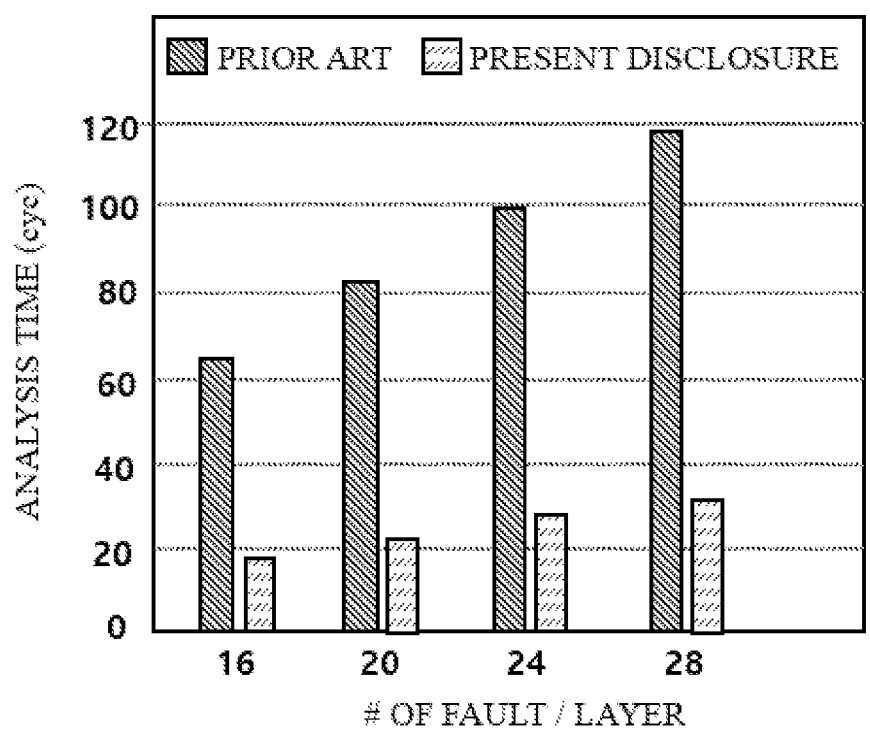
FIG. 11 is a graph illustrating a simulation result of the analysis time of an embodiment of the present disclosure.

FIG. 11 is a graph showing comparison of redundancy analysis time among simulations that compared embodiments of the present disclosure with the related art in order to verify the effects of the present disclosure, wherein a horizontal axis denotes the number of faults per layer and a vertical axis denotes the analysis time. It is assumed that the size of a memory cell is 1,024×1,024, faults have a Poisson probability distribution with an expected value of $\lambda=20$, and the types of faults are single faults of 60%, row-wise faults of 20%, and column-wise faults of 20%.

Figure 12:
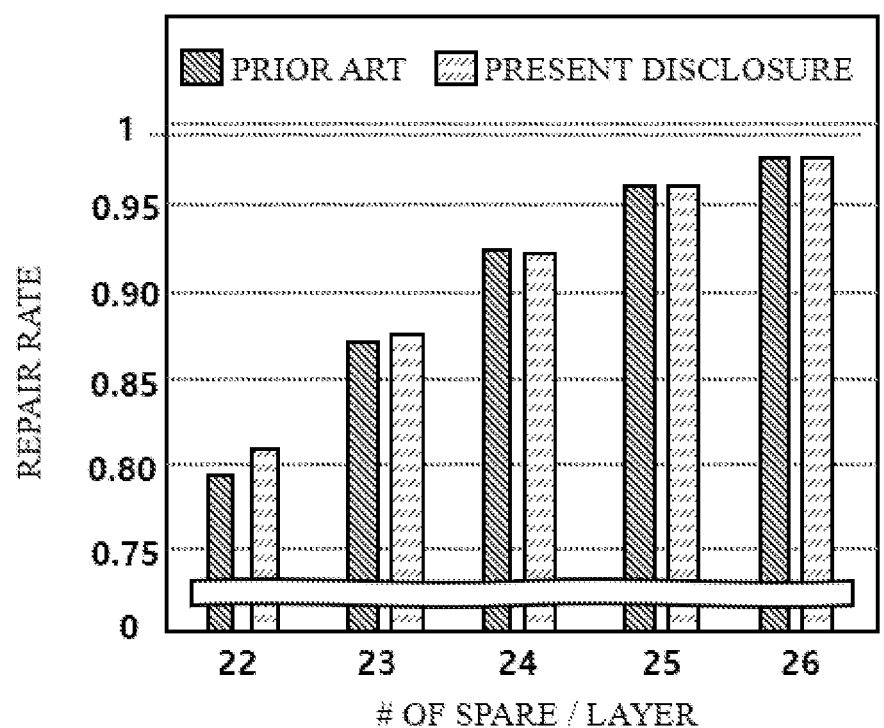
FIG. 12 is a graph illustrating a simulation result of the repair rate of an embodiment of the present disclosure.

Referring to FIG. 11, it can be seen that the analysis time of the dynamic redundancy method of the present disclosure is minimized compared to the static redundancy method in the related art. Particularly, the greater the number of faults detected in each layer, the more prominent the effect of the present disclosure is. For example, when the number of faults per layer is 28, the absolute time saved is greater than when the number of faults per layer is 16. The test time tends to increase rapidly as the degree of integration of a semiconductor memory increases and the cost associated with the test also tends to increase. Thus, the saving of redundancy analysis time is important in mass production of semiconductor memories. FIG. 12 is a diagram showing comparison of repair rates between an embodiment of the present disclosure and the related art, and a horizontal axis denotes an extra cell per layer and a vertical axis denotes a repair rate. It can be seen that there is no significant difference in the repair rate between the embodiment of the present disclosure and the related art.

Figure 13:
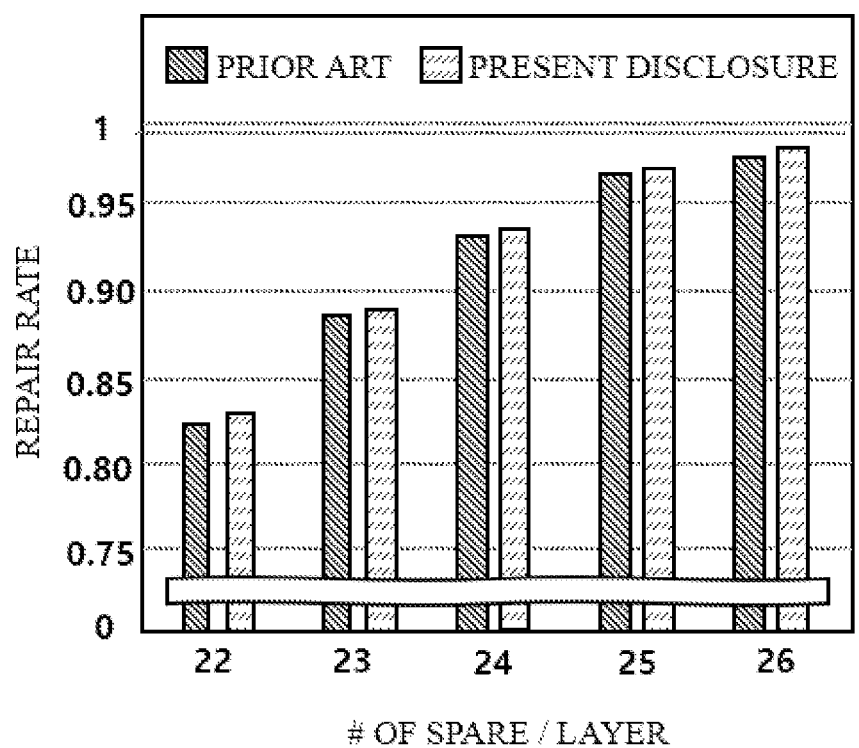
FIG. 13 to FIG. 15 are simulation results of the repair rate under different conditions of an embodiment of the present disclosure.
Figure 14:
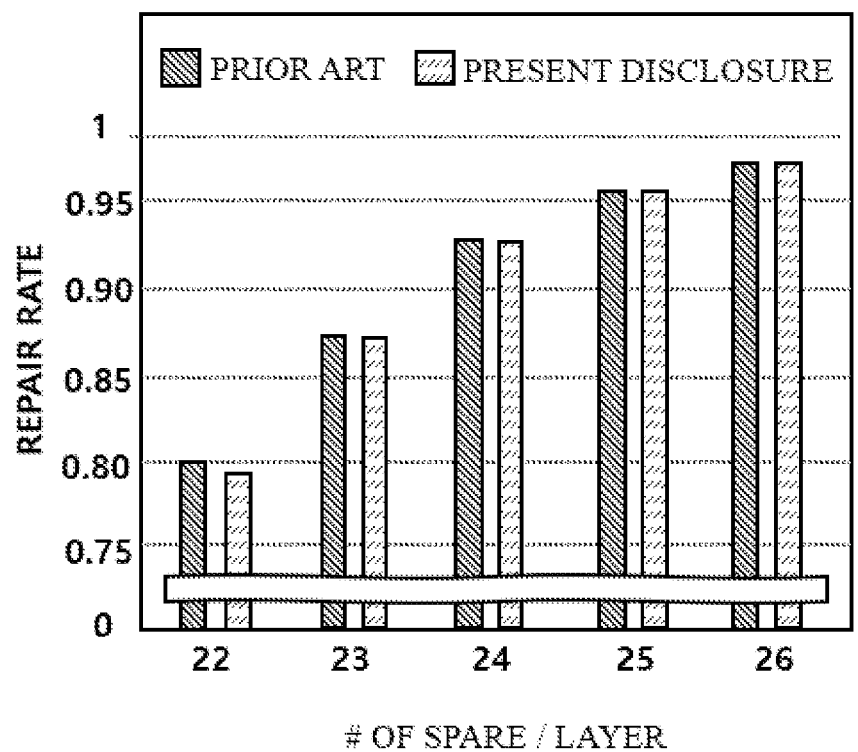
Figure 15:
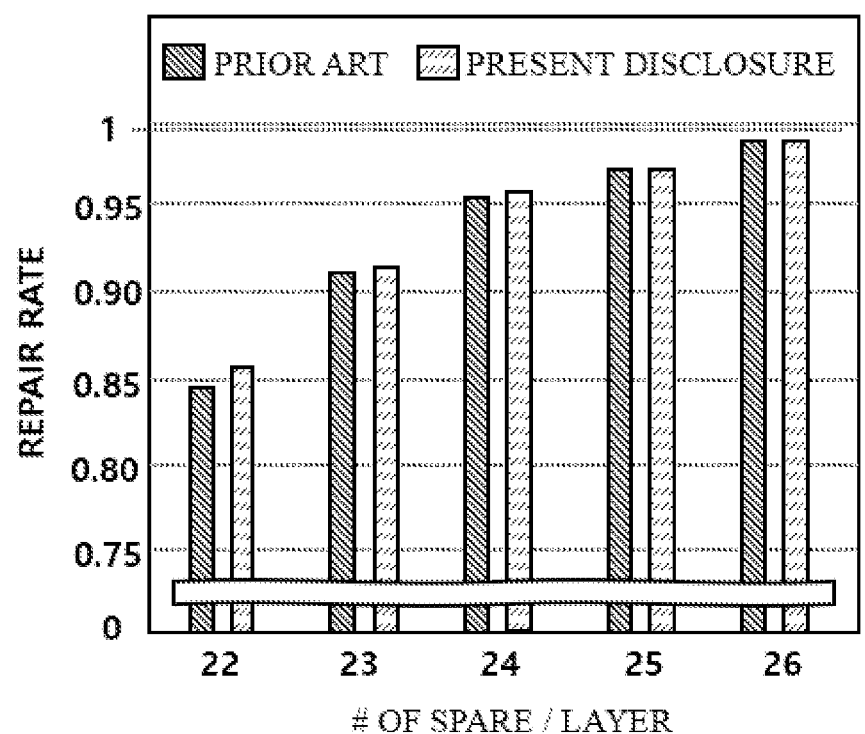

In order to further verify the advantage that accrues when a fault clustering technology of the present disclosure is applied, including that analysis time is saved and there is little reduction in the repair rate, verification was attempted while the types of faults were changed to have various ratios. For example, even when simulations were performed while the size of the memory cells is fixed to 2,048×512 and the ratio of single faults, row-wise faults, and column-wise faults are changed from (0.6, 0.2, 0.2) to (0.6, 0.35, 0.05) and (0.6, 0.05, 0.35), no significant reduction in the repair rate occurs, as illustrated in FIG. 13 to FIG. 15.

Figure 16:
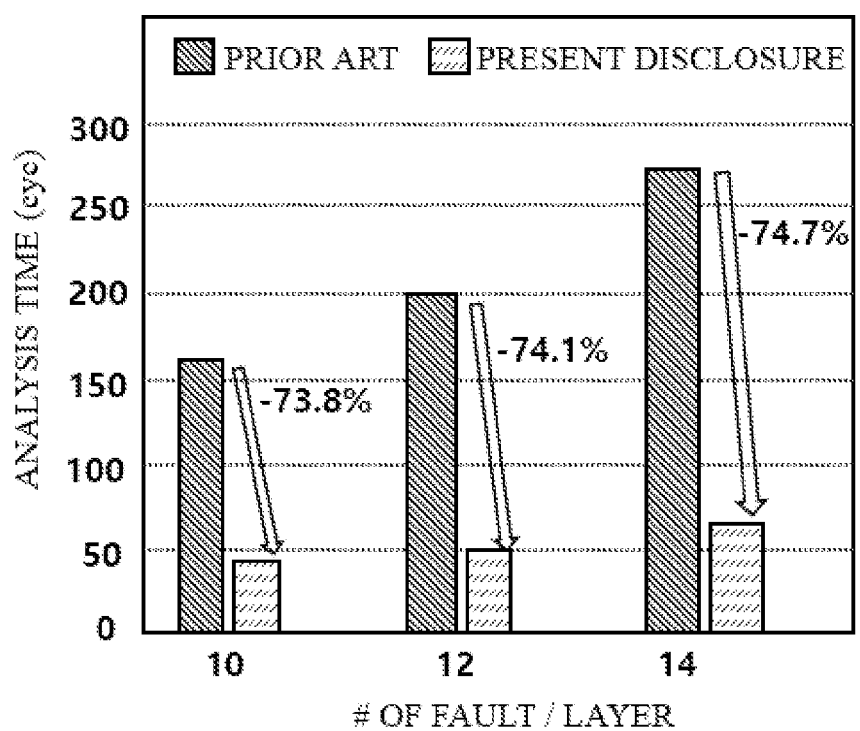
FIG. 16 is a graph illustrating another simulation result of the analysis time of an embodiment of the present disclosure.

In another simulation result of redundancy analysis time performed under different conditions, as illustrated in FIG. 16, time is reduced by 70% or more in an embodiment of the present disclosure compared to the related art. In FIG. 16, a horizontal axis indicates the assumed number of faults per layer (i.e., 10, 12, and 14,) and a vertical axis indicates the analysis time expressed in cycles. For reference, in the simulation of FIG. 16, it was assumed that the size of the memory cells was selected as 1,024×1,024, redundancy capable of treating 16 spares was provided in each of two layers, the ratio of single faults, row-wise faults, and column-wise faults was (0.6, 0.2, 0.2), and the faults followed a Poisson probability distribution.

Although the present disclosure has been described with reference to the embodiments illustrated in the drawings, the embodiments of the disclosure are for illustrative purposes only, and those skilled in the art will appreciate that various modifications and equivalent other embodiments are possible from the embodiments. Thus, the true technical scope of the present disclosure should be defined by the following claims.

What is claimed is:

1. A dynamic fault clustering method comprising:
   (1) initiating a self-test of a memory cell array divided into a plurality of layers;
   (2) performing a search for a current fault in the memory cell array;
   (3) in response to the search detecting the current fault, performing a check of whether a row address or a column address of the current fault in one layer matches a row address or a column address in a previously detected fault of another layer stored in an address storage device;
   (4) determining a layer number to which the current fault belongs when the row address or the column address of the current fault matches the row address or the column address of the previously detected fault;

(5) determining whether to perform a row-must or column-must repair when the row address or the column address of the current fault does not match the row address or the column address of the previously detected fault;
(6) storing information on a row-must or column-must repair flag in a redundancy storage device when it is determined to perform the row-must or column-must repair;
(7) determining whether to cluster the current fault with the previously detected fault in another layer in response to determining not to perform the row-must or column-must repair;
(8) storing corresponding layer information in the address storage device when it is determined that the current fault is to be clustered; and
(9) storing corresponding layer information in the redundancy storage device when it is determined that the current fault is not to be clustered,
wherein when the self-test initiated in step (1) is not completed, steps (2) through (9) are repeated.

2. The dynamic fault clustering method of claim 1, wherein storing the corresponding layer information in the address storage device includes storing information indicating row-wise clustering or column-wise clustering in the redundancy storage device.

3. The dynamic fault clustering method of claim 1, wherein the redundancy storage device is a content addressable memory.

4. The dynamic fault clustering method of claim 1, wherein the address storage device is a content addressable memory.

5. The dynamic fault clustering method of claim 1, wherein the redundancy storage device includes the row address, the column address, and a layer address of the current fault.

6. The dynamic fault clustering method of claim 1, wherein the redundancy storage device includes a space for storing a flag signal indicating whether to apply row repair or column repair to the current fault.

7. The dynamic fault clustering method of claim 1, wherein the redundancy storage device includes a mapped address for clustering.

8. The dynamic fault clustering method of claim 1, wherein the address storage device includes a space for storing a flag signal indicating whether the clustered fault corresponds to a row-wise exchange or a column-wise exchange.

* * * * *